United States Patent
Fowler (10) Patent No.: US 8,488,027 B2
(45) Date of Patent: Jul. 16, 2013

(54) IMAGING ARRAY WITH MODULATED PIXELS

(75) Inventor: Boyd Fowler, Sunnyvale, CA (US)

(73) Assignee: BAE Systems Imaging Solutions, Inc., Milpitas, CA (US)

( * ) Notice: Subject to any disclaimer, the term of this patent is extended or adjusted under 35 U.S.C. 154(b) by 202 days.

(21) Appl. No.: 13/177,279

(22) Filed: Jul. 6, 2011

(65) Prior Publication Data

US 2011/0260039 A1  Oct. 27, 2011

Related U.S. Application Data

(62) Division of application No. 12/254,762, filed on Oct. 20, 2008, now Pat. No. 7,999,865.

(51) Int. Cl.
*H04N 3/14* (2006.01)
*H04N 5/335* (2011.01)
*H04N 5/213* (2006.01)
*H04N 5/217* (2011.01)
*H04N 5/361* (2011.01)

(52) U.S. Cl.
USPC ............................................ 348/243; 348/308

(58) Field of Classification Search
USPC ....... 348/241, 243, 294, 302, 308; 250/208.1; 257/291, 292, 293, 294
See application file for complete search history.

(56) References Cited

U.S. PATENT DOCUMENTS

| | | | | |
|---|---|---|---|---|
| 6,380,571 B1 * | 4/2002 | Kalnitsky et al. | ............. | 257/291 |
| 6,906,793 B2 * | 6/2005 | Bamji et al. | ................. | 348/302 |
| 7,110,498 B2 * | 9/2006 | Yamada | ........................ | 348/308 |
| 7,279,669 B2 * | 10/2007 | Uehara | ........................ | 348/294 |
| 2004/0135911 A1 * | 7/2004 | Nathan et al. | ................. | 348/308 |
| 2012/0138774 A1 * | 6/2012 | Kelly et al. | ................ | 250/208.1 |

* cited by examiner

*Primary Examiner* — Jason Whipkey
(74) *Attorney, Agent, or Firm* — Calvin B. Ward (57) ABSTRACT

An imaging array and a method for operating the same are disclosed. The imaging array includes a plurality of light pixels and a sense amplifier. Each light pixel includes a photodetector that generates and couples a signal indicative of a light exposure to a light pixel node, a readout circuit, and a mixer that mixes a signal on the light pixel node with a pixel oscillator signal. The sense amplifier includes an input node that receives a signal from each light pixel, one light pixel at a time. The sense amplifier also includes a high pass filter that attenuates signals with frequencies less than a cutoff frequency and a mixer that demodulates the signal from the filter to provide a signal that is related to the potential on the light pixel node of the light pixel connected to the first input node.

5 Claims, 8 Drawing Sheets

IMAGING ARRAY WITH MODULATED PIXELS

CROSS REFERENCE TO RELATED APPLICATIONS

This is a divisional of application Ser. No. 12/254,762 filed Oct. 20, 2008 now U.S. Pat. No. 7,999,865.

BACKGROUND OF THE INVENTION

Cameras based on CMOS imaging arrays are rapidly displacing cameras based on CCD imaging arrays. The noise levels in CMOS cameras are central both to the cost of the camera and minimum light intensity at which the camera can operate. Each pixel includes a photodiode and a readout circuit. The readout circuitry has a finite noise floor that is dominated by 1/f noise. In addition, other sources of noise such as common mode noise due to transients in power supplies also contribute to the noise.

The signal from the photodiode is proportional to the amount of light that is intercepted by the photodiode during the image exposure period. This signal is proportional to the area occupied by the photodiode; hence, to overcome the noise from the readout circuitry at low light levels there is a tradeoff between increasing the size of the photodiodes, and hence, the imaging array and the minimum light intensity at which the array can operate. Since the cost of the imaging array is determined by the area of silicon in the CMOS imaging array, lowering the noise floor can provide either a decrease in cost of the imaging array or improved low-light sensitivity.

Many of the common mode noise sources can be reduced by providing more complex circuitry such as better regulated power supplies or power regulators on the imaging chips. However, these solutions also increase the cost of the imaging array. For low priced imaging systems such as those provided in cellular telephones and PDAs, these costs are significant.

In addition, the pixels exhibit significant dark current. That is, charge is accumulated even when the photodiodes are not exposed to light. This dark current presents problems at low light levels, and hence, makes it more difficult to design smaller pixels that can operate at low light levels. The contribution of the dark current to the pixel signals depends both on the exposure time of the image and the time between the closing of the camera shutter and the readout of the pixels. Hence, it must be measured separately for each exposure and readout. Again, the cost of correcting for the dark current increases the cost of the camera.

SUMMARY OF THE INVENTION

The present invention includes an imaging array and a method for operating the same. In one aspect of the invention, the imaging array includes a plurality of light pixels and a sense amplifier. Each light pixel is connectable to the sense amplifier in response to a control signal coupled to that light pixel. Each light pixel includes a photodetector that couples a signal indicative of a light exposure to a light pixel node; a readout circuit for outputting a signal related to potential on the light pixel node, and a light pixel mixer that mixes a signal on the light pixel node with a pixel oscillator signal having a first frequency. The sense amplifier includes a first input node that receives a signal from each light pixel, one light pixel at a time. The sense amplifier also includes a first high pass filter connected to the first input node and attenuating signals with frequencies less than a cutoff frequency and a first sense amplifier mixer that receives an output of the first high pass filter, and mixes that output with a signal from a second oscillator having a second frequency to obtain a first mixed signal. The first mixed signal is input to a low pass filter that blocks signals having frequencies greater than a cutoff frequency. The output of the low pass filter is related to the potential on the light pixel node of the light pixel connected to the first input node.

In another aspect of the invention, the mixers are capacitors and the first and second oscillators are square wave oscillators having the same frequency, the second oscillator being 180 degrees out of phase with the first oscillator.

In another aspect of the invention, the imaging array includes a common mode noise rejection pixel. The common mode noise rejection pixel includes one of the light pixels. The sense amplifier further includes a second input node that receives a signal from the common mode noise rejection pixel and a second high pass filter connected to the second input node that attenuates signals with frequencies less than a cutoff frequency. The sense amplifier also includes a second sense amplifier mixer coupled to an output of the second high pass filter. The second sense amplifier mixer mixing signals output by the second high pass filter with the second frequency to obtain a second mixed signal. The sense amplifier utilizes a differential amplifier to generate a signal indicative of a difference between the first and second mixed signals.

In yet another aspect of the invention, the differential amplifier includes an inverting input, a non-inverting input, and a cross-connect switch having first and second cross connect inputs and first and second cross connect outputs. The first and second sense amplifier mixers mix a square wave of the second frequency with outputs of the first and second high pass filters, respectively, and the first and second mixer signals are input to the first and second cross connect inputs, respectively. The first cross-connect output is connected to the inverting input and the second cross connect output is connected to the non-inverting input, the cross connect switch is operated by the square wave.

In a still further aspect of the invention, each light pixel includes a reset gate that connects the light pixel node to a reset node that is maintained at a reset potential in response to a reset signal. The imaging array further includes a controller that controls a pixel oscillator that generates and couples the pixel oscillator signal to the light pixel mixer in response to a first oscillator control signal from the controller and which generates a fixed potential that is coupled to the light pixel mixer in response to a second oscillator control signal from the controller. The controller causes a charge stored in the photodiode in one of the light pixels to be transferred to the light pixel node in that light pixel while generating the second oscillator control signal and then generates the first oscillator control signal and records the output of the low pass filter while that pixel is connected to the sense amplifier. The controller resets the light pixel node by connecting the light pixel node to a reset node that is held at a fixed potential while the controller generates the second control signal. The controller disconnects the light pixel node in that light pixel from the reset node and then generates the first control signal. The controller records the output of the low pass filter while the controller generates the first control signal and causes that light pixel to be connected to the sense amplifier.

In yet another aspect of the invention, the readout circuit in each light pixel includes a source follower having an FET with a gate connected to the pixel node and a drain connected to a row power node. The pixel mixer includes a capacitor that connects the pixel node to the drain of the FET, the row power node having a first state in which the row power node is connected to a DC potential and a second state in which the row power node is connected to the pixel oscillator signal. The parasitic capacitance between the drain and the gate of the FET is utilized to couple the oscillator signal to the pixel node.

DETAILED DESCRIPTION OF THE PREFERRED EMBODIMENTS OF THE INVENTION

The present invention reduces the 1/f noise and common mode power supply and stray signal noise of an imaging array without significantly increasing the size of the imaging array, and hence, its cost. One aspect of the present invention is based on the observation that the 1/f noise can be reduced by modulating the signal from the photodiode during the readout of the charge from the photodiode. The manner in which the present invention provides its advantages can be more easily understood with reference to FIG. 1, which is a schematic drawing of a prior art CMOS imaging array. Imaging array 40 is constructed from a rectangular array of pixels 41. Each pixel includes a photodiode 46 and an interface circuit 47. The details of the interface circuit depend on the particular pixel design. However, all of the pixels include a gate that is connected to a row line 42 that is used to connect that pixel to a bit line 43. The specific row that is enabled at any time is determined by a row address that is input to a row decoder 45. The row select lines are a parallel array of conductors that run horizontally in the metal layers over the substrate in which the photodiodes and interface circuitry are constructed.

Figure 1:
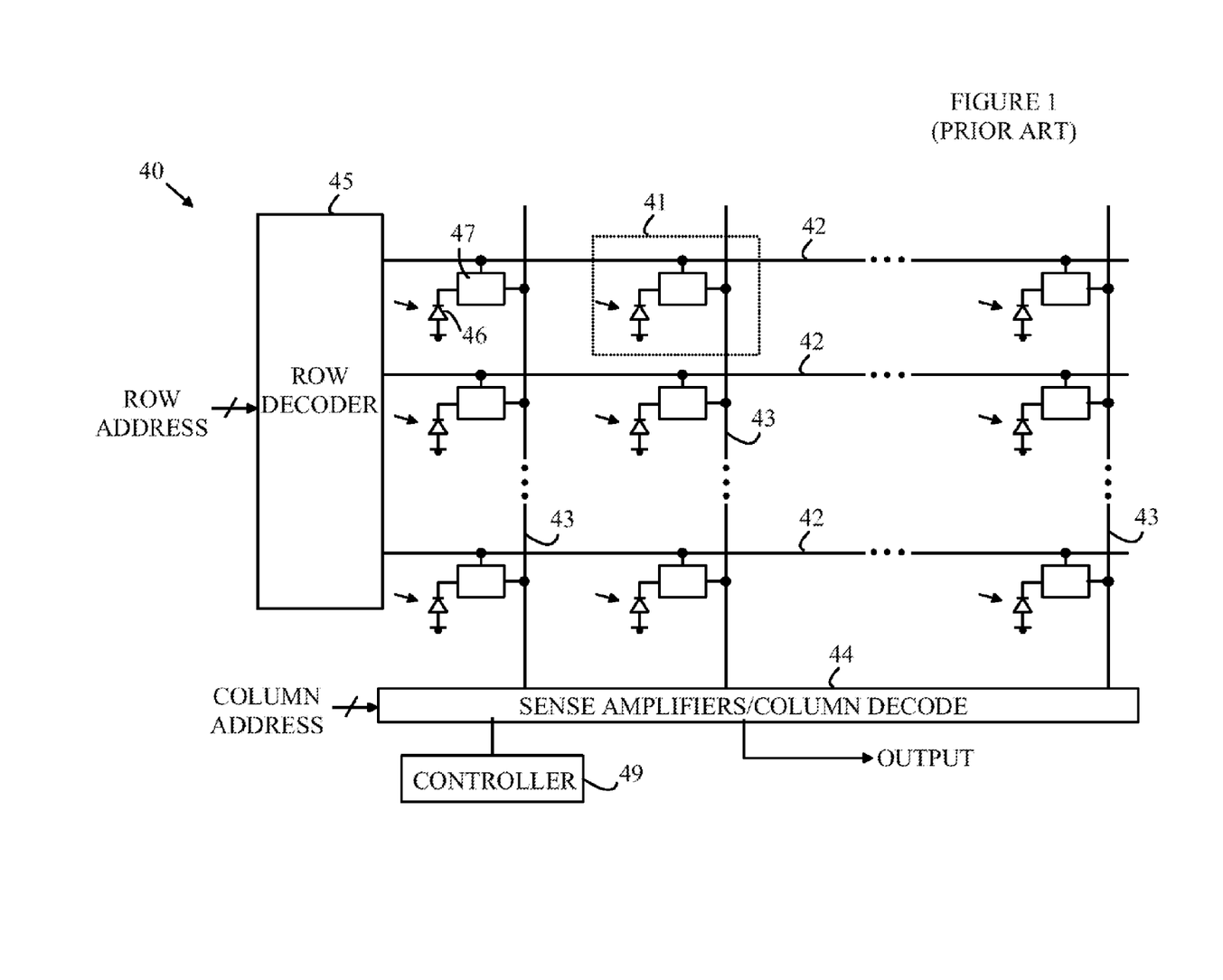
FIG. 1 is a schematic drawing of a prior art CMOS imaging array.

The various bit lines terminate in a column processing circuit 44 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an analog-to-digital converter (ADC). At any given time, a single pixel is readout from the imaging array. The specific column that is readout is determined by a column address that is utilized by a column decoder to connect the sense amplifier/ADC output from that column to circuitry that is external to the imaging array. The various timing operations and address generation is carried out by a controller 49.

To provide low noise, all of the electrons must be removed from the photodiodes when the photodiodes are reset at the beginning of an exposure. To assure complete reset, pinned photodiodes are utilized. In a pinned photodiode, the charge generated by the photons is stored in a potential well that is at a lower potential than the region in which the charge is generated. The storage region is adjacent to a gate transistor. When the gate transistor is placed in a conductive state, all of the charge moves out of the gate onto a node that is held at a potential that assures that all of the charge will leave the photodiode, and hence, the photodiode can be reset.

Figure 2:
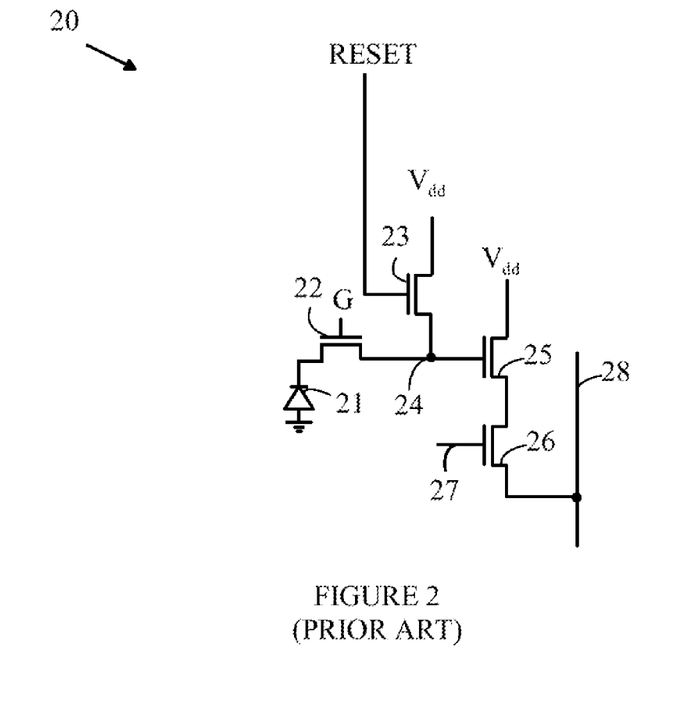
FIG. 2 is a schematic drawing of a prior art pixel that is commonly used in CMOS imaging arrays.

Refer now to FIG. 2, which is a schematic drawing of a prior art pixel that is commonly used in CMOS imaging arrays. Pixel 20 includes 4 transistors 22, 23, 25, and 26 and is often referred to as a 4-transistor pixel cell. Photodiode 21 is reset prior to the image exposure by placing gates 22 and 23 in the conductive state, such that the cathode of photodiode 21 is connected to $V_{dd}$. After the reset operation, gates 22 and 23 are placed in the non-conductive state. During the image exposure, a charge that is related to the light exposure is stored adjacent to gate 22 in photodiode 21. During readout, charge from photodiode 21 is transferred onto node 24 by transistor 22 and converted to a voltage by the capacitance of node 24. When pixel 20 is selected by a signal on row line 27, transistor 26 applies this voltage to bit line 28.

Figure 3:
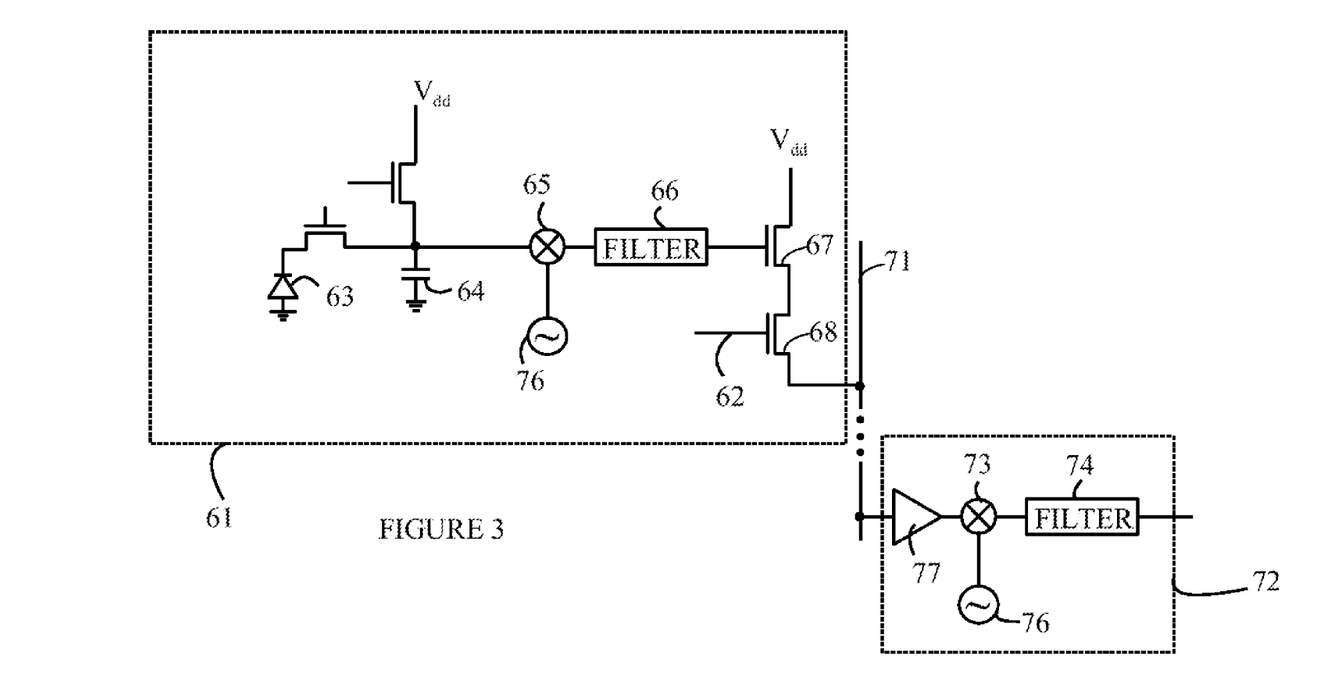
FIG. 3 illustrates an imaging array based on a modulated pixel design.

Refer now to FIG. 3, which illustrates an imaging array based on a modulated pixel design. To simplify the drawing only one pixel in one row is shown. However, it is to be understood that the imaging array includes a plurality of columns and rows of pixels that are organized in a manner similar to that shown in FIG. 1. Similarly, there is a controller that generates the various control signals utilized by the pixels and sense amplifiers.

Pixel 61 is connected to a bit line 71 in response to a signal on row line 62. The signals on bit line 71 are processed by sense amplifier 72 to provide a signal that is related to the charge accumulated by photodiode 63 during an exposure. All of the pixels in the column that contains pixel 61 are connected to bit line 71. There is one such sense amplifier associated with each column of pixels in the imaging array.

After photodiode 63 has accumulated charge during an exposure, the charge is transferred to capacitor 64 in a manner analogous to that described above. The potential on capacitor 64 is up-converted by mixer 65 that is driven from a high-frequency signal source 76 that is shared by all of the pixels. The output of mixer 65 is then filtered by filter 66 to provide the upconverted signal that is amplified by transistor 67 and output onto bit line 71 via gate 68. Since the upconverted signal has a significantly higher frequency, the problems associated with 1/f noise in transistors 67 and 68 are substantially reduced.

The signal on bit line 71 is recovered by down-converting the signal in sense amplifier 72. The signal on bit line 71 is input to mixer 73 with a signal from frequency source 76. The resultant signal is then low-pass filtered by filter 74. Since transistor 67 is operated as a source follower, the output signal from transistor 67 is too small in many cases to be processed without further amplification. Amplifier 77 provides additional gain to overcome the low signal strength.

While pixel 61 has substantially reduced 1/f noise, the amount of additional circuitry in pixel 61 required to provide this reduction is unacceptable in many applications. In particular, the mixer and band pass filter must be replicated in each pixel in the memory. In addition, the problems associated with common mode noise and dark current are not reduced by this design.

Figure 4:
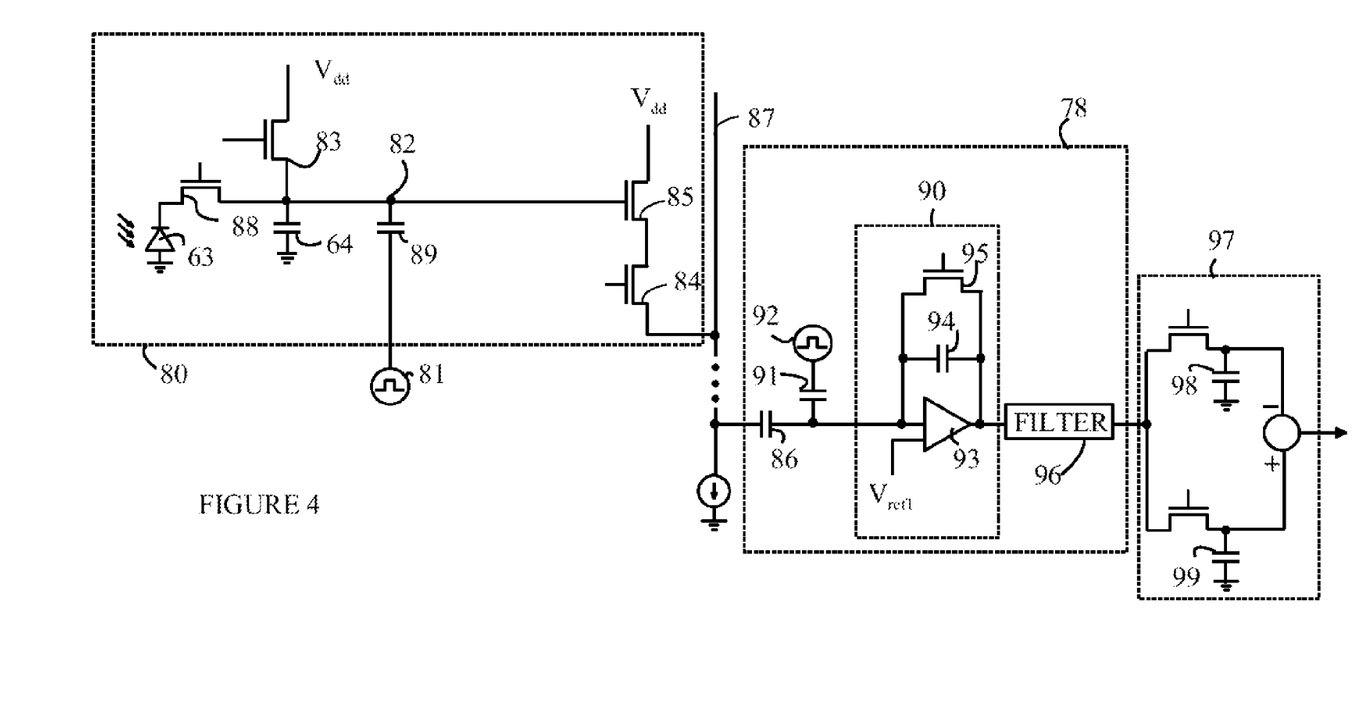
FIG. 4 illustrates an imaging array that utilizes one aspect of the present invention.

Refer now to FIG. 4, which illustrates an imaging array that utilizes one aspect of the present invention. Again, to simplify the drawing only one pixel 80 of the array is shown. Pixel 80 is in a column of pixels that is readout through bit line 87. Pixel 80 includes a photodiode 63 that is coupled to node 82 via gate 88. Prior to coupling the charge on photodiode 63 to node 82, the potential on node 82 is set to a predetermined potential via gate 83. The potential on node 82 is read by up-converting the potential on node 82 by mixing that potential with a signal from a square wave oscillator 81 that is coupled to node 82 by capacitor 89. The frequency of oscillator 81 is chosen to reduce the 1/f noise of transistors 84 and 85.

It should be noted that pixel 80 does not include a band pass filter within pixel 80; hence, pixel 80 does not require significantly more silicon area than a conventional 4-transistor CMOS pixel. In this regard, it should be noted that capacitor 89 is constructed in the metal layers above the silicon substrate, and hence, does not significantly increase the size of pixel 80.

The band pass filter that was within each pixel in the embodiment shown in FIG. 3 has been replaced by capacitor 86 that is part of the readout circuit that includes sense amplifier 78. Hence, only one such band pass filter is required per row of pixels. In addition, this capacitor is constructed in the metal layers, and hence, does not significantly increase the size of the imaging array. The capacitance of capacitor 86 is chosen such that the capacitor blocks the low frequency noise generated by transistors 84 and 85 while passing the up-converted pixel signal. Each bit line is terminated in a current source to provide a DC signal path to ground.

The up-converted pixel signal that passes through capacitor 86 is down-converted back to base band by mixing the signal with a square wave from oscillator 92 that has the same frequency as oscillator 81 and is 180 degrees out of phase with oscillator 81. The output of oscillator 81 is coupled to the output of capacitor 86 by capacitor 91. The down-converted signal is amplified through a capacitive transimpedance amplifier 90 constructed from amplifier 93 and capacitor 94. A reset switch 95 is used to short the output of amplifier 93 to its non-inverting input prior to each measurement. The output of amplifier 93 is filtered through a low-pass filter 96 to recover the base band signal representing the charge on node 82 in the pixel being readout.

As noted above, prior to measuring the charge from photodiode 63, the potential on node 82 is reset by placing gate 83 in the conducting state. However, there is some variation in the final potential at node 82 from reset to reset operation. This variation is another source of noise that limits the minimum light signal that can be accurately measured by the pixel. To reduce this source of noise, double sampling techniques are employed. In a double-sampled imaging array, the potential on node 82 is measured prior to measuring the charge stored on photodiode 63 and stored. After the charge on photodiode 63 is transferred to node 82 and measured, the stored background potential is subtracted from the measured signal of the photodiode.

In one embodiment of the present invention, an analogous double sampling technique is utilized. In this embodiment of the present invention, the potential on node 82 is reset at the beginning of the readout cycle for each pixel by turning off oscillator 81 and placing transistor 83 in a conducting state. After transistor 83 is returned to the non-conducting state, the potential on node 82 is measured by turning on oscillator 81 and mixing the signal on node 82 with the signal from oscillator 81. Transistor 84 is then placed in the conducting state and the potential on bit line 87 is measured and stored on capacitor 98 in sample-and-hold circuit 97.

After the background reading is stored, oscillator 81 is again turned off and the charge of photodiode 63 is transferred to node 82 by placing transistor 88 in the conducting state. Oscillator 81 is then turned on again, and the signal on node 82 is measured in the same manner. The resultant signal is stored on capacitor 99 in sample-and-hold circuit 97. The two stored signals are then subtracted to provide a measure of the charge that was stored on photodiode 63 during the image exposure. Prior to the next image exposure, both transistors 83 and 88 are placed in the conducting state and oscillator 81 is again turned off. This resets the potential on photodiode 63 and removes any charge that has been accumulated during the time that has elapsed since the pixel was readout. During the times in which oscillator 81 is turned off, the terminal of capacitor 89 that is connected to the oscillator is connected to ground.

The above-described embodiments of the present invention provide a substantial reduction in 1/f noise; however, these embodiments do not correct for common mode noise such as transients on the power supply lines or RF signals that are picked up by the imaging array. In addition, these embodiments do not correct for dark current in the pixels.

Define the dark signal to be the signal that the pixel would generate if the pixel received no light during the exposure and was readout as described above. In principle, the dark current could be measured by utilizing an additional array of pixels in which each of the photodiodes was covered by a light shield.

Figure 5:
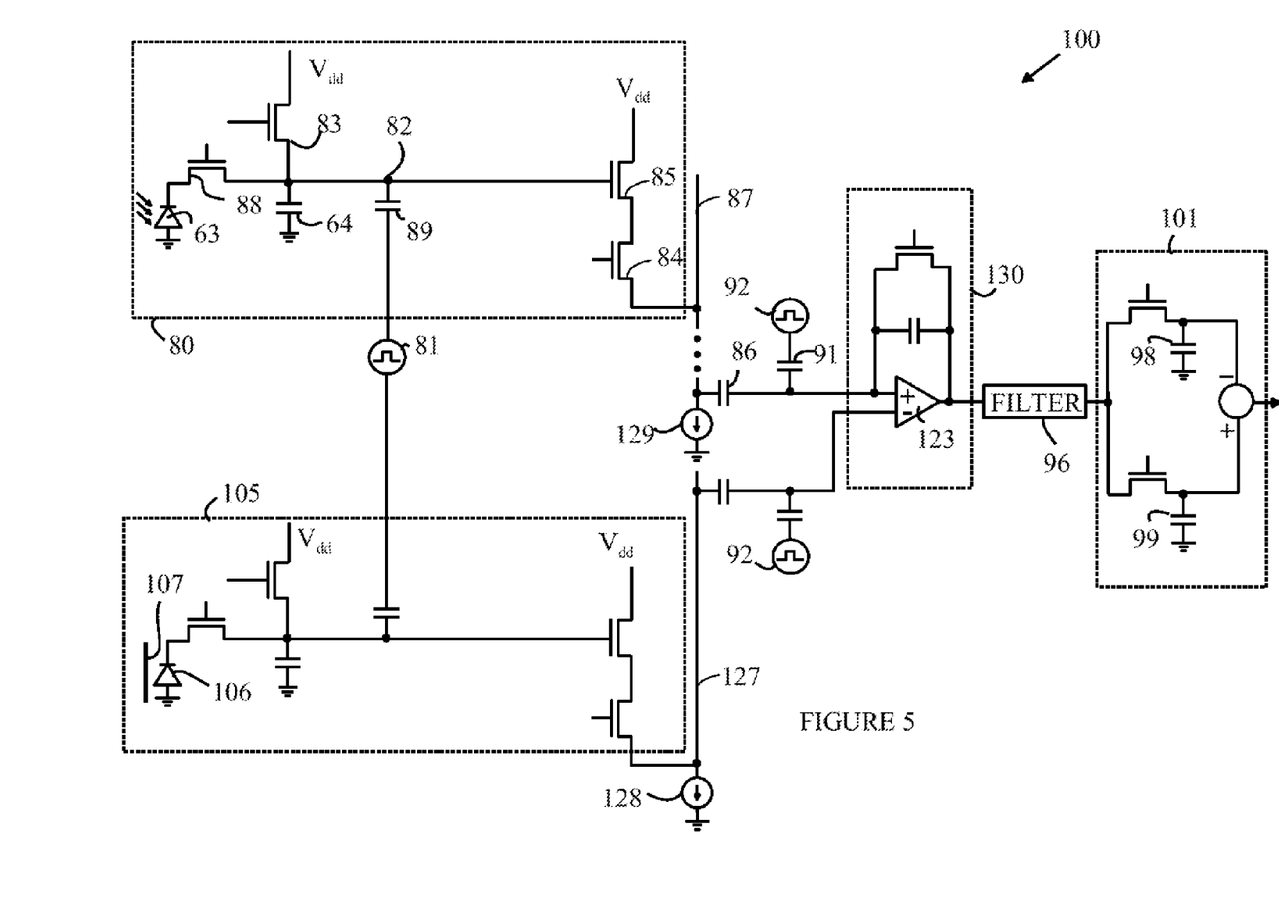
FIG. 5 illustrates an imaging array according to an embodiment of the present invention that corrects for the dark signals and common mode noise.

The manner in which embodiments of the present invention correct for the dark signals can be more easily understood with reference to FIG. 5, which illustrates an imaging array according to an embodiment of the present invention that corrects for the dark signals and common mode noise. Again, to simplify the drawing, only one column of pixels in imaging array 100 is shown.

Each column of pixels has two sets of pixels. The first set is connected to a bit line 87 and operates in the manner discussed above with respect to the embodiment shown in FIG. 4. Bit line 87 terminates in a constant current source 129. The pixels in the first set are readout in a manner analogous to that discussed above. Bit line 87 is coupled to the non-inverting input of amplifier 123 in readout circuit 130. The signal from each pixel in the first set are readout one pixel at a time using a double sampling technique that is analogous to that discussed above.

The second set of pixels is connected to a separate bit line 127 in the column that terminates in constant current source 128. The pixels on this bit line include dark pixels. An exemplary pixel in this set is shown at 105. The pixels in the second set are identical to those in the first set except that a light shield 107 covers the photodiodes 106 in the second set. In imaging array 100, there is one dark pixel for each conventional pixel that measures a pixel in an image.

During the readout of each of the pixels in the first set, the corresponding pixel in the second set is also readout in the same manner. The signal from the corresponding dark pixel is coupled to bit line 127 and down sampled in a manner analogous to that discussed above. However, the down converted dark signal is input to the inverting input of amplifier 123, and hence, is subtracted from the signal of the corresponding pixel in the second set of pixels. It should be noted that this arrangement also corrects for common mode noise, as the noise signals will be present both on the bit line 87 and bit line 127, and hence, amplifier 123 will subtract the common mode noise out.

A double sampling procedure that is analogous to that discussed above is utilized in the readout as shown at 101. However, in the case of imaging array 100 the signal stored on capacitor 98 is the difference of the reset noise in the two pixels, and the signal stored on capacitor 99 is the difference of the image pixel signal and the corresponding dark signal.

While imaging array 100 has reduced common mode noise, reduced dark current and reduced 1/f noise, imaging array 100 requires twice the number of pixels, and hence, is too expensive for many applications. An imaging array that corrects for much of the dark signal while reducing the common mode and 1/f noise can be constructed with only one additional pixel per column utilizing the principles discussed with respect to FIG. 5.

There are two sources of dark current in each pixel, the photodiode and the floating diffusion in which the readout circuit is fabricated. The photodiode's contribution to the dark signal depends on the exposure time and the rate at which the photodiode generates dark current.

The floating diffusion's contribution to the dark signal depends on the readout time, i.e., the time between resetting node 82 and the time at which the charge from the photodiode is readout on the bit line and on the rate at which the floating diffusion generates dark current. The rate of charge generation by the floating diffusion is significantly greater than that of the photodetector.

Furthermore, in the modulated pixel scheme described above, the readout time can be significantly longer than the exposure time. The time to readout each pixel must be much longer than the period of oscillator 81. This readout is repeated twice for each pixel, once for the reset noise measurement and once for the charge that was stored on the photodiode. The exposure time, in contrast, is limited to prevent motion artifacts in the image.

Figure 6:
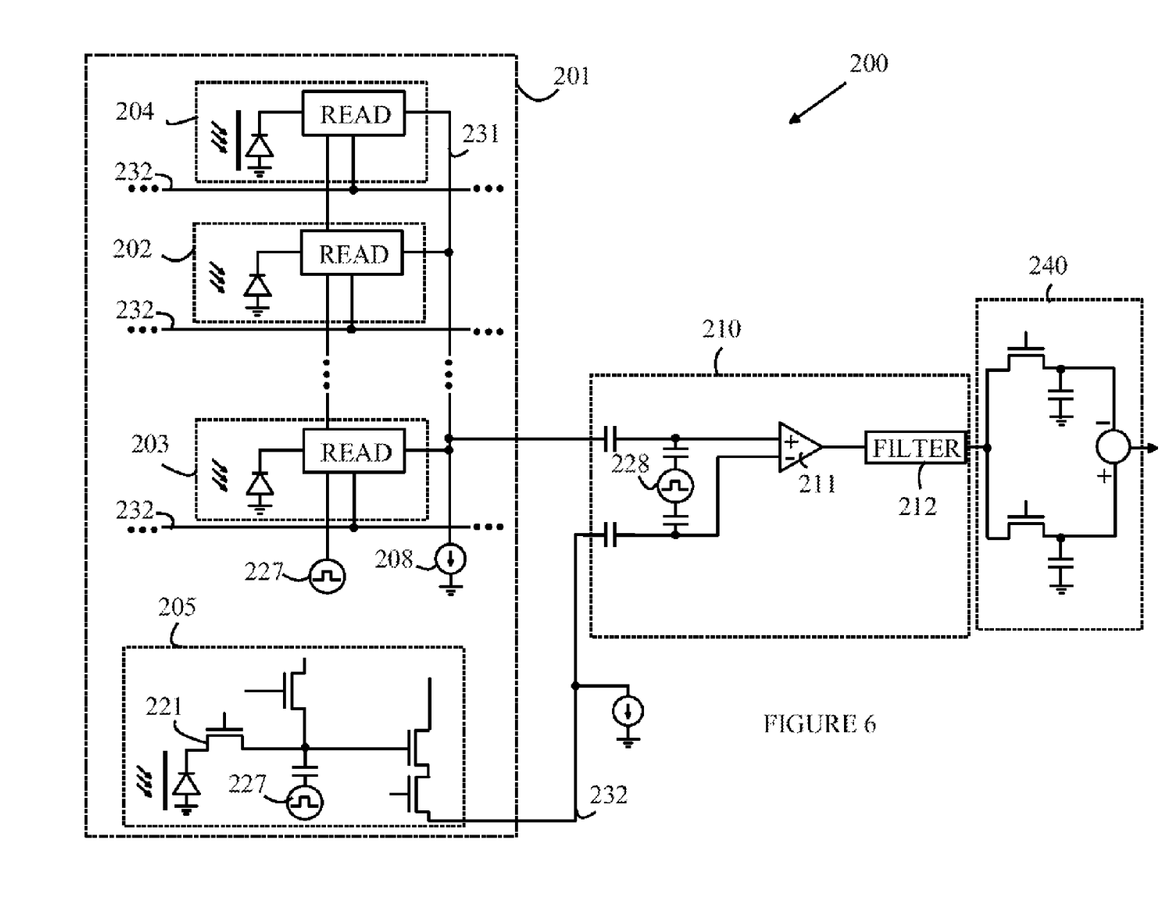
FIG. 6 illustrates another embodiment of an imaging array according to the present invention.

Refer now to FIG. 6, which illustrates another embodiment of an imaging array according to the present invention. Again, to simplify the drawing, only one column of pixels within imaging array 200 is shown, namely column 201. Column 201 includes three types of pixels. The first type of pixel measures the light at corresponding points in the image and will be referred to as "light" pixels. Each pixel includes a photodiode and a readout circuit. Examples of light pixels are shown at 202 and 203. To simplify the drawing, the readout circuitry in each light pixel is shown as a single box in the drawing. The readout circuit is connected to a bit line 231, and is read out on that bit line in response to signals on the row select line 232 connected to that bit line. Bit line 231 terminates in a constant current source 208 that provides the DC termination for the bit line.

The second type of pixel is used to correct for common mode noise and for dark current generated in the floating diffusion areas in which the transistors are fabricated. There is one such pixel in each row, namely pixel 205. This pixel will be referred to as the common mode correction pixel in the following discussion. Pixel 205 is identical to the light pixels with the exception of a shield that prevents pixel 205 from being exposed to light during the image exposure.

The third type of pixel is an optional dark pixel 204 that is used to measure the dark current signal from the photodiode and to correct for that signal if necessary.

During the readout operation, one of the pixels attached to bit line 231 and the common mode correction pixel are connected to a differential amplifier assembly 210. The sense amplifier is implemented as a differential amplifier assembly 210 that demodulates the chopped signals from the pixels and from the common mode correction pixel and provides a signal that is related to the difference of these two signals. The demodulation utilizes an oscillator 228 that is 180 degrees out of phase with respect to oscillator 227, and filter 212. The demodulated signals are subtracted and amplified by differential amplifier 211.

Double sampling readout is performed in a manner analogous to that described above. The results are stored in a memory 240 that outputs the difference of the two measurements obtained during the readout of each pixel.

During each pixel readout, the common mode correction pixel is readout without opening gate 221. However, in all other respects, the common mode correction pixel is cycled in the same manner as the light pixels. The photodiode is included in the common mode correction pixel to assure that this pixel is identical to the light pixels so that the output of this pixel on line 232 is an accurate reflection of the common mode noise and the dark current generated in the floating diffusion. At the beginning of each image, the photodiode in common mode correction pixel 205 is reset in the same manner as the photodiodes in the light pixels.

As noted above, each column could also include an optional dark pixel 204. The dark pixel is connected to the same bit line as the light pixels and is readout in the same manner as the light pixels. Hence, the signal from the dark pixel measures the dark current that was accumulated by the photodiode during the exposure, since the signal from the common mode correction pixel already subtracts the contribution from the floating diffusion. The signal from the dark pixel can be stored in the same manner as the signals from the light pixels as part of the image. After the image has been readout, the controller can subtract this value from all of the pixels, and thus correct for this component of the dark current.

The noise reduction scheme used in imaging array 200 depends on the amplifier assembly accurately subtracting the signal from the common mode correction pixel from the signals from the light pixels that are presented on bit line 231. To the extent that the amplifier assembly fails to accurately subtract the signals, the noise correction will be less than complete.

Figure 7:
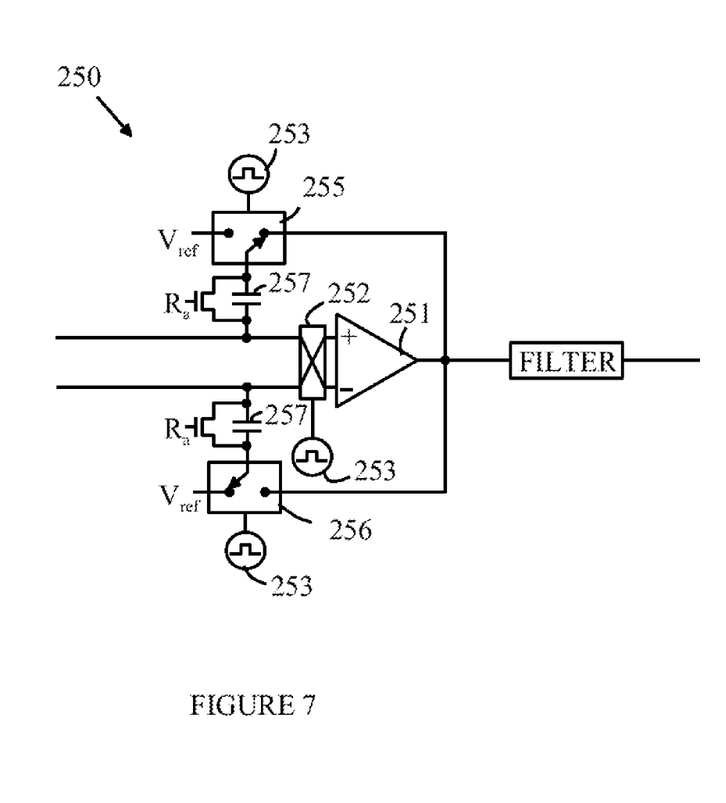
FIG. 7 illustrates one embodiment of a differential demodulating amplifier assembly that can be utilized in the present invention.

One method for assuring accurate noise cancellation is to make amplifier assembly 210 symmetric with respect to the non-inverting and inverting inputs to the amplifier. Refer now to FIG. 7, which illustrates one embodiment of a differential demodulating amplifier assembly that can be utilized in the present invention. Differential demodulating amplifier assembly 250 may be viewed as a capacitive transimpedance amplifier based on a differential amplifier 251 in which the roles of the inverting and non-inverting inputs are switched back and forth at the modulation frequency, and hence, the gain experienced by each signal is the average of the gains experienced at the inverting and non-inverting inputs to amplifier 251. The switching of the inputs is provided by cross-connect switch 252 and switches 255 and 256 that are driven at the modulation frequency by oscillator 253.

For the purposes of this discussion, a cross-connect switch is defined to be a 4 terminal switch having first and second input terminals and first and second output terminals. The switch has two states. In the first state, the first input terminal is connected to the first output terminal, and the second input terminal is connected to the second output terminal. In the second state, the first input terminal is connected to the second output terminal, and the second input terminal is connected to the first output terminal.

During one half cycle, the transimpedance amplifier is configured to have the capacitive feedback loop connected between the output of amplifier 251 and the inverting input to amplifier 251 via switch 255. The non-inverting amplifier input is connected to a reference potential $V_{ref}$ during this half cycle. During the other half cycle, the capacitive feedback loop is between the output of amplifier 251 and the inverting input to amplifier 251 via switch 256, and the non-inverting input is connected to the reference potential $V_{ref}$. The feedback capacitors 257 are shorted prior to each measurement by applying a signal Ra to the switches across these capacitors. The alternating of the feedback capacitors 257 between the inverting and non-inverting inputs of the amplifier 251 provides the demodulation of the input signals that are provided by oscillator 228 shown in FIG. 6.

Figure 8:
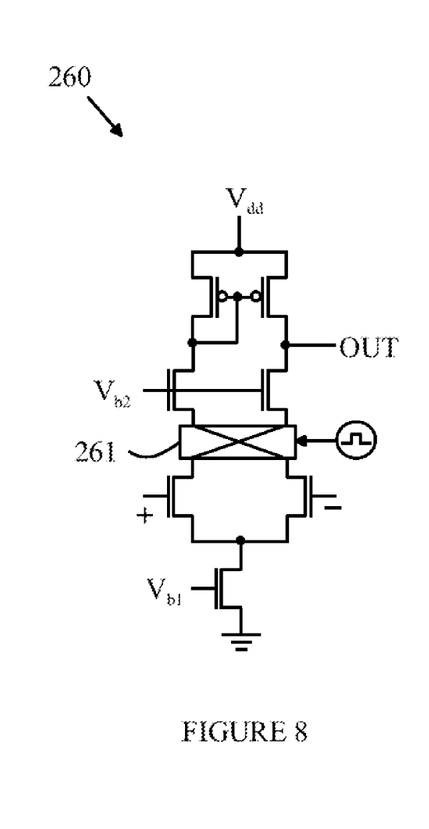
FIG. 8 is a schematic drawing of a cascode amplifier that incorporates a cross-connect switch.

It should be noted that cross-connect switch 252 could be incorporated into a conventional cascode amplifier that is used in place of amplifier 251. Such arrangement is shown in FIG. 8, which is a schematic drawing of a cascode amplifier 260 that incorporates a cross-connect switch 261. Cross-connect switch 261 interchanges the inverting and non-inverting inputs. The voltage levels $V_{b1}$ and $V_{b2}$ are bias voltages that determine the operating characteristics of amplifier 260.

Refer again to FIG. 4. The signal on node 82 during the time oscillator 81 is on is determined by the relative values of capacitors 64 and 89. The signal from oscillator 81 is divided between the two capacitors. Hence, capacitor 89 should have a capacitance that is the same order of magnitude as that of the parasitic capacitor 64 to assure that a significant fraction of the oscillator signal appears at node 82. When charge is transferred from the photodiode to node 82, oscillator 89 is turned off, and capacitor 89 is coupled to ground so as not to alter the potential on node 82. In this configuration the capacitance at node 82 is the sum of the capacitances of capacitors 64 and 89. This capacitance determines the light to voltage conversion factor for the pixel, since the charge moved to the capacitor from the photodiode is proportional to the light received during the exposure. The voltage at node 82 per unit charge is inversely proportional to the sum of the two capacitances. To provide the greatest conversion factor, the sum of the capacitances should be as small as possible. The capacitance of capacitor 64 is determined by the fabrication process, and hence, cannot be reduced further. Accordingly, capacitor 89 should be significantly smaller than capacitor 64 to avoid any significant decrease in the charge to voltage conversion factor.

In addition, the variation in capacitor 89 from pixel to pixel within a column should be as small as possible. In embodiments in which the common mode correction pixel aspect of the present invention is not utilized, differences in the capacitor values are less critical, since the differences only lead to variations in the amplitude of the AC signal received at amplifier 93. Since the AC signal is demodulated and only the DC component is kept, these differences in amplitude from pixel to pixel are less important.

It should also be noted that differences in capacitance values of capacitor 64 from pixel to pixel also exist. These differences give rise to a fixed pattern noise that is equivalent to a variation in the light to voltage conversion ratio from pixel to pixel. Correction for such variations is typically made by storing a calibration factor for each pixel and correcting the final image using the measured light to voltage conversion factors. This correction mechanism will also correct for any differences in the light to voltage conversion factor introduced by variations in the values of capacitors 89 from pixel to pixel.

Now consider the case in which the common mode correction pixel scheme is also utilized. There are two sources of noise in the system. The first noise source is common mode noise that arises from the common mode sources and that has an amplitude that is not altered by small variations in the parasitic capacitance between the various pixels. This noise will be accurately subtracted by the systems discussed above.

The second source of noise is the dark current that originates in the floating diffusion region of each pixel and accumulates on capacitor 64. This signal depends on the size of the capacitors in each pixel, since the signal arises from a charge that is stored on the capacitor in the pixel in which that dark current is generated. Hence, differences in the capacitance values can lead to variations in the amount of the dark current signal that is actually subtracted during the common mode noise correction. Accordingly, the capacitors should have capacitances that are as close as possible if the floating diffusion related dark current is significant.

Figure 9:
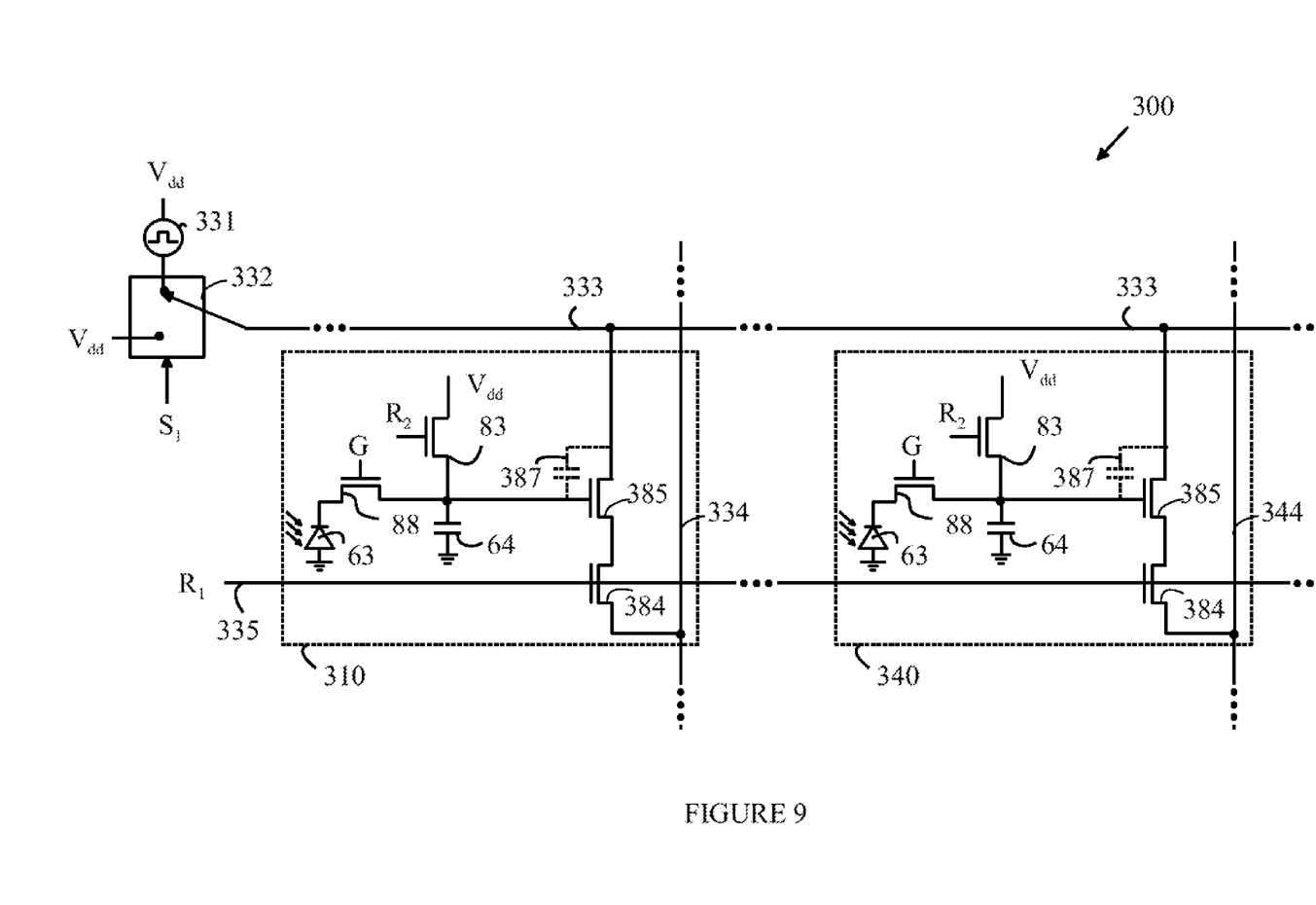
FIG. 9 illustrates two pixels in one row of an imaging array according to another embodiment of the present invention.

The above described embodiments couple the oscillator to each pixel through a capacitor such as capacitor 89 shown in FIG. 4. However, embodiments in which the oscillator signal is coupled through the parasitic capacitance between the drain and the gate of the source follower in the readout circuit of each pixel could also be utilized. Refer now to FIG. 9, which illustrates two pixels in one row of an imaging array according to another embodiment of the present invention. Pixel 310 is located in the same row as pixel 340. Pixel 310 is in a column of pixels that is serviced by bit line 334, and pixel 340 is in a column of pixels that is serviced by bit line 344. Each bit line terminates in a differential amplifier assembly such as differential amplifier assembly 210 discussed above. To simplify the drawing the readout circuitry connected to each of the bit lines has been omitted.

Refer now to pixel 310. Pixel 310 is a 4-transistor pixel that is similar to the pixels discussed above. The source follower in pixel 310 is shown at 385. Transistor 385 has a parasitic capacitance 387 that couples the drain of transistor 385 to the gate of transistor 385. Hence an AC signal applied to the drain of transistor 385 will be capacitively coupled to the gate of transistor 385 in a manner analogous to that described above with respect to capacitor 89; hence, a separate external capacitor is not needed to couple the oscillator signal to the pixel node in the pixel.

All of the pixels in a given row are driven in parallel during the readout process. The drains of all of the source follower transistors in each row are connected to a row drain line 333 corresponding to that row. Line 333 terminates on switch 332. During those portions of the readout cycle in which the pixel nodes are required to be connected to an oscillator, switch 332 is set to connect row drain line 333 to oscillator 331 that provides a square wave that has a DC level set by $V_{dd}$ and an amplitude sufficient to modulate the signals on the pixel nodes. During those portions of the readout cycle in which the oscillator is in the 'off' state, switch 332 is set to connect line 333 to $V_{dd}$.

The gate transistors 384 that connect the output of the source followers to the corresponding bit line are likewise driven together by signals on row line 310. Similarly, the gate of transfer gate 88 in each pixel in a row is connected to a common line corresponding to that row. To simplify the drawing, the common line has been omitted. Finally, the gate of each reset transistor 83 in a row is connected to a common reset line corresponding to that row. Once again, to simplify the drawing, the common reset line has been omitted.

In the above-described embodiments, the oscillator used to up-convert the pixel signals and the sense amplifier oscillator used to down-convert the signals from the bit lines are square wave oscillators of the same frequency but out of phase by 180 degrees. However, embodiments in which other waveforms are utilized could also be constructed using the teachings of the present invention. In particular, oscillators that generate sine waves could be utilized. In addition, the frequency of the down converting oscillator could be different from that of the up-converting oscillator. In this case, the down-converted signal would be at a frequency above baseband.

The frequency of the mixing oscillator discussed above places a lower limit on the readout time for the imaging array. The time to readout each row must be sufficient in terms of cycles of this oscillator to assure that the signal on the pixel node is upconverted without introducing artifacts. In addition, the frequency must be sufficient to allow the signal to pass through the capacitor in each pixel. As noted above, the capacitor in question preferably has a capacitance that is smaller than the parasitic capacitance of the pixel node in the absence of the capacitor. Hence, to prevent the mixing capacitor from differentiating the square wave, each half square wave cycle must be less than the RC time constant of this capacitance. In this case, R is the input impedance of the source follower in the readout circuit. Fortunately, the impedance values in question are large. In one embodiment, the frequency of the oscillator is 10 Mhz and the capacitance of the mixing capacitor is 1 fF.

Various modifications to the present invention will become apparent to those skilled in the art from the foregoing description and accompanying drawings. Accordingly, the present invention is to be limited solely by the scope of the following claims.

What is claimed is:

1. A method of operating an imaging array to generate an image, said imaging array comprising a plurality of light pixels and a sense amplifier, each light pixel being connectable to said sense amplifier in response to a control signal coupled to that light pixel, wherein each light pixel comprises a photodetector that couples a signal indicative of a light exposure to a light pixel node; a readout circuit for outputting a signal related to potential on said light pixel node, and a light pixel mixer that mixes a signal on said light pixel node with a pixel oscillator signal having a first frequency, said method comprising:
   transferring charge from said photodetector to said pixel node in one of said pixels;
   coupling an oscillator signal having a first frequency to that pixel node;
   connecting that pixel to said sense amplifier;
   receiving an AC signal generated by said readout circuit of that pixel;
   filtering said AC signal through a band pass filter having a low frequency cutoff that blocks noise from said readout circuit in that pixel to create a filtered AC signal; and
   demodulating said filtered AC signal to provide a signal indicative of said transferred charge.

2. The method of claim 1 wherein said oscillator signal comprises a square wave at said first frequency and wherein demodulating said filtered AC signal comprises mixing said received AC signal with a square wave at said first frequency that is shifted in phase by 180 degrees from said square wave of said oscillator signal.

3. The method of claim 1 wherein said imaging array further comprises a common mode noise rejection pixel (CMNR pixel), said CMNR pixel comprising one of said light pixels, and wherein said method further comprises:
   generating a common mode noise signal from said CMNR pixel by coupling said oscillator signal having said first frequency to said pixel node of said CMNR pixel; and
   filtering an output signal from said readout circuit in said CMNR pixel through a band pass filter having said low frequency cutoff that blocks noise from said readout circuit in said CMNR pixel to create a filtered common mode noise AC signal,
   wherein demodulating said filtered AC signal comprises subtracting said demodulated filtered common mode noise signal from said filtered AC signal.

4. The method of claim 1 wherein said method further comprises:
   connecting said pixel node in one of said light pixels to a constant reset potential;
   disconnecting said pixel node from said reset potential;
   coupling said oscillator signal having said first frequency to that pixel node;
   connecting that pixel to said sense amplifier;
   receiving an AC signal generated by said readout circuit of that pixel;
   filtering said AC signal through a band pass filter having a low frequency cutoff that blocks noise from said readout circuit in that pixel to create a filtered AC signal;
   demodulating said filtered AC signal to provide a signal indicative of a potential on said pixel node when said pixel node was disconnected from said reset potential; and
   storing a value related to that signal.

5. The method of claim 1 wherein coupling said oscillator signal having a first frequency to that pixel node comprises coupling a signal having said first frequency to a drain of an FET in said readout circuit.

* * * * *